May 12, 1959 — E. T. SMYTHE — 2,886,069
MACHINE FOR MAKING SLATTED MATERIAL
Filed Aug. 2, 1956 — 5 Sheets-Sheet 1
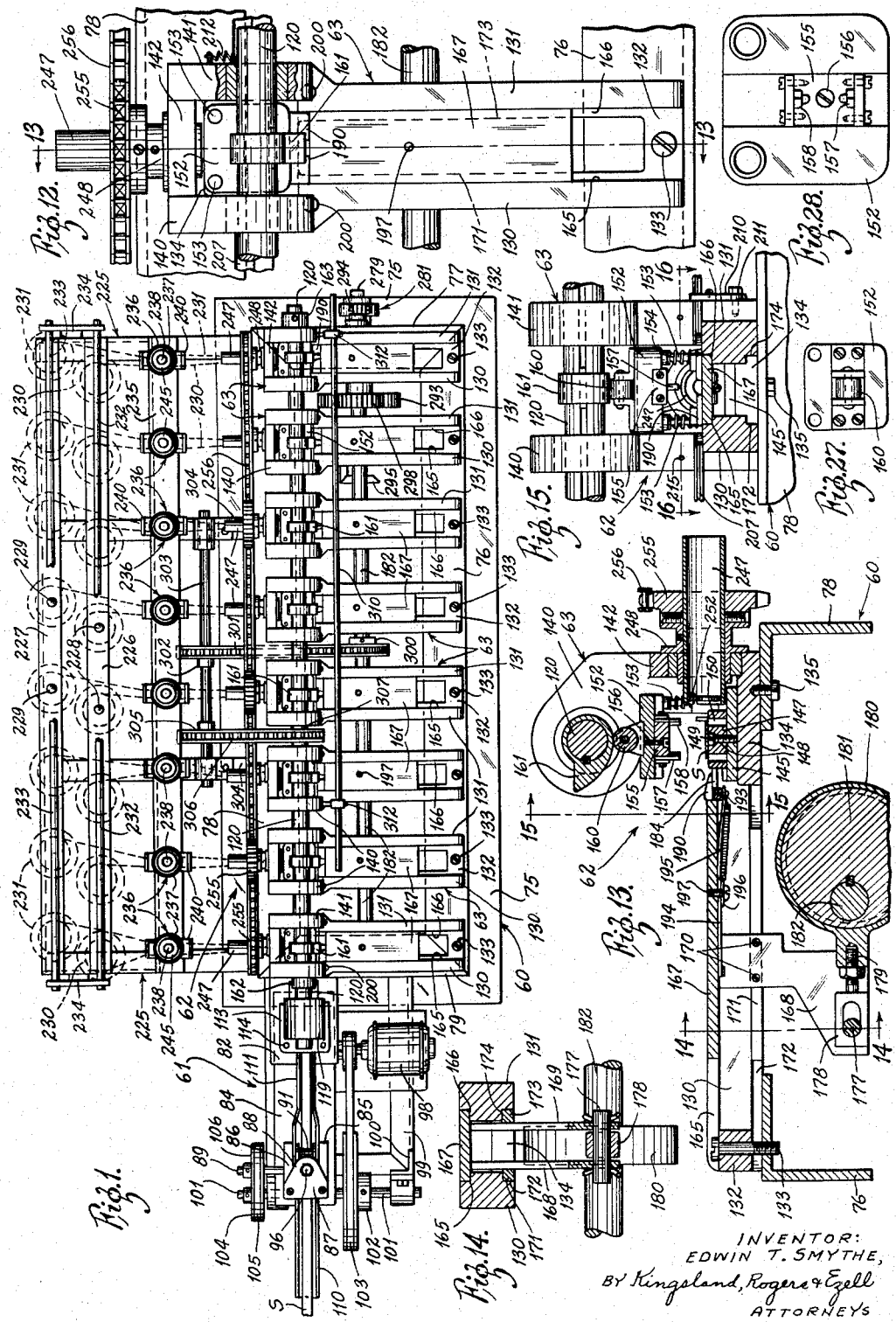
INVENTOR:
EDWIN T. SMYTHE,
BY Kingsland, Rogers & Ezell
ATTORNEYS

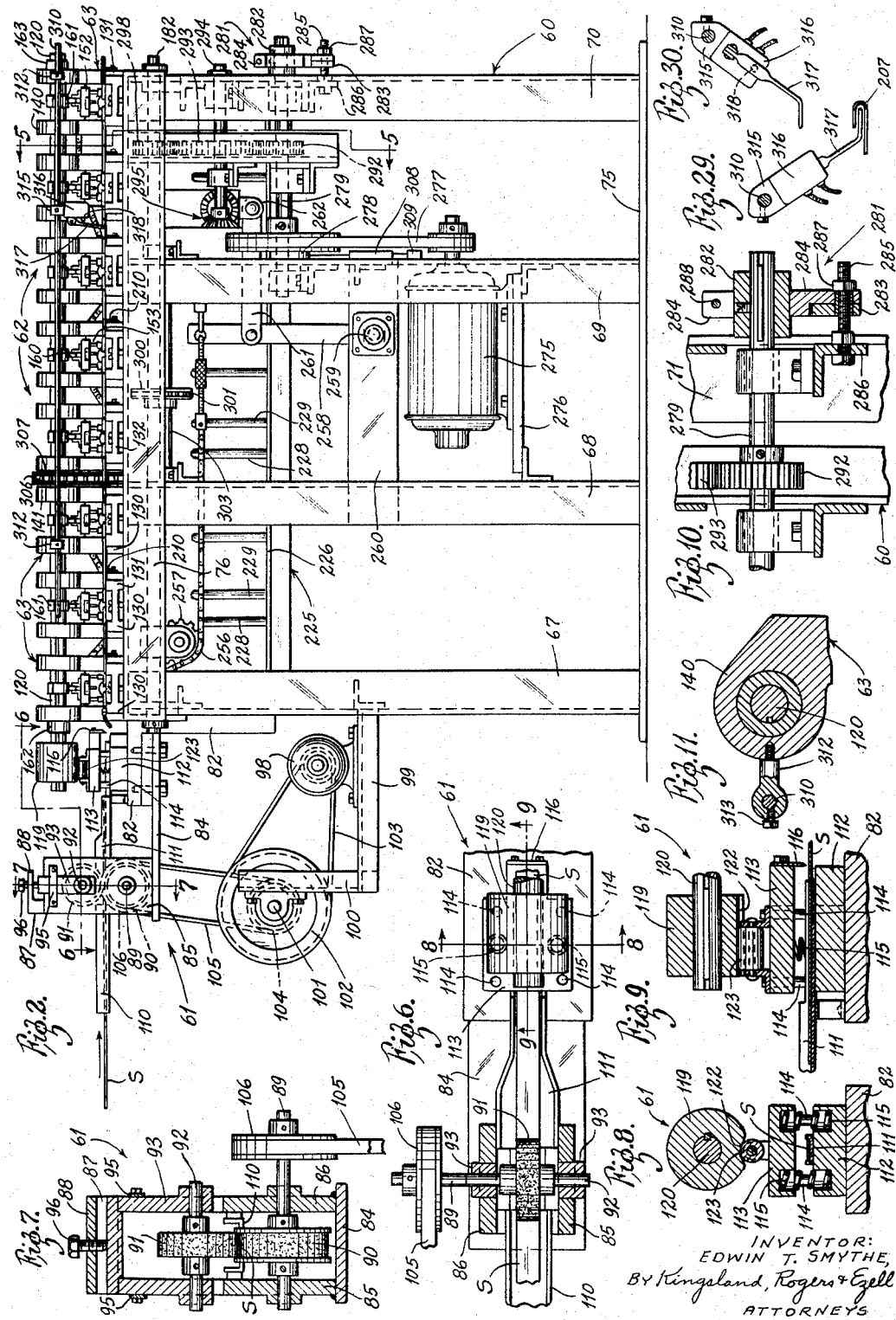

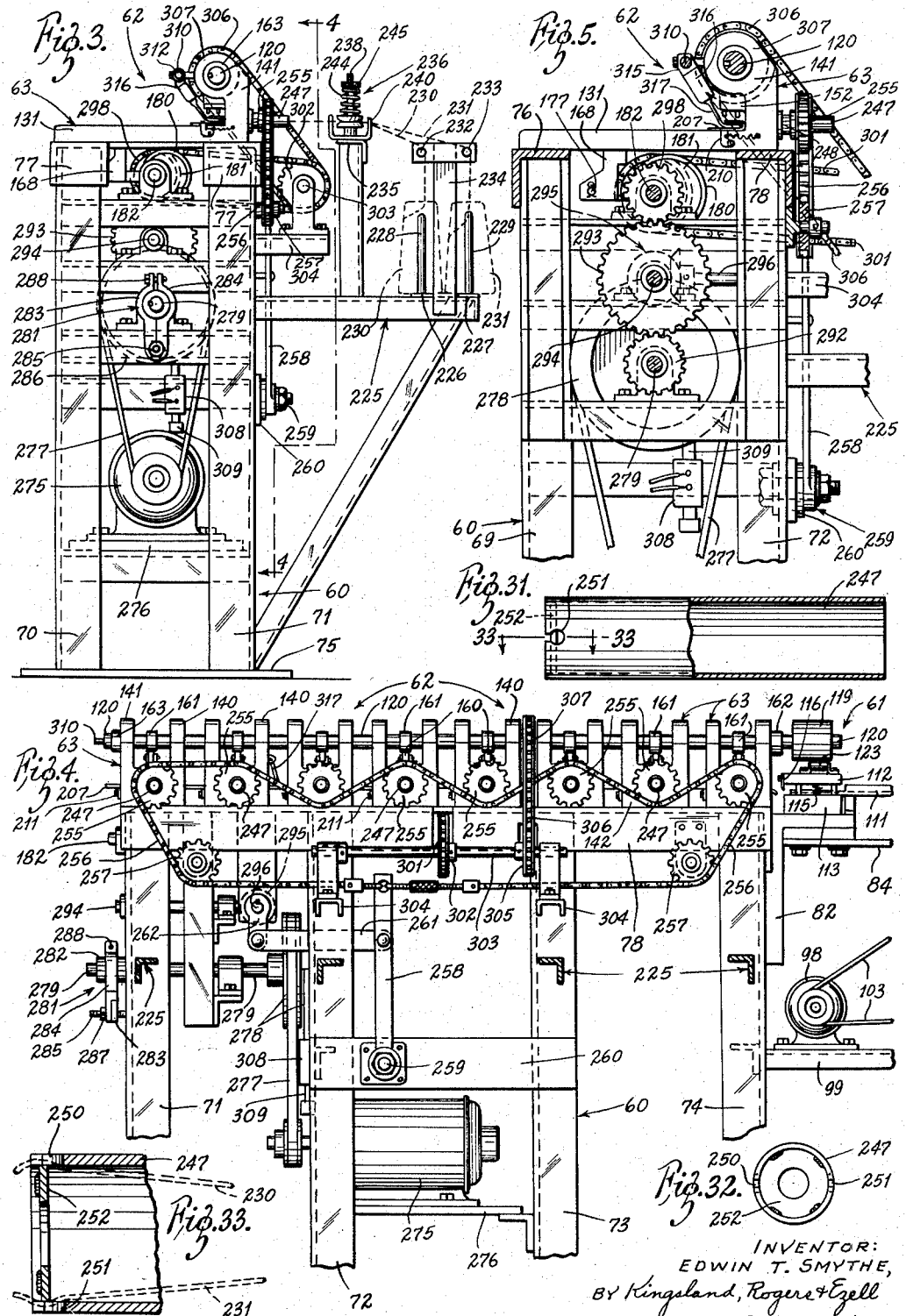

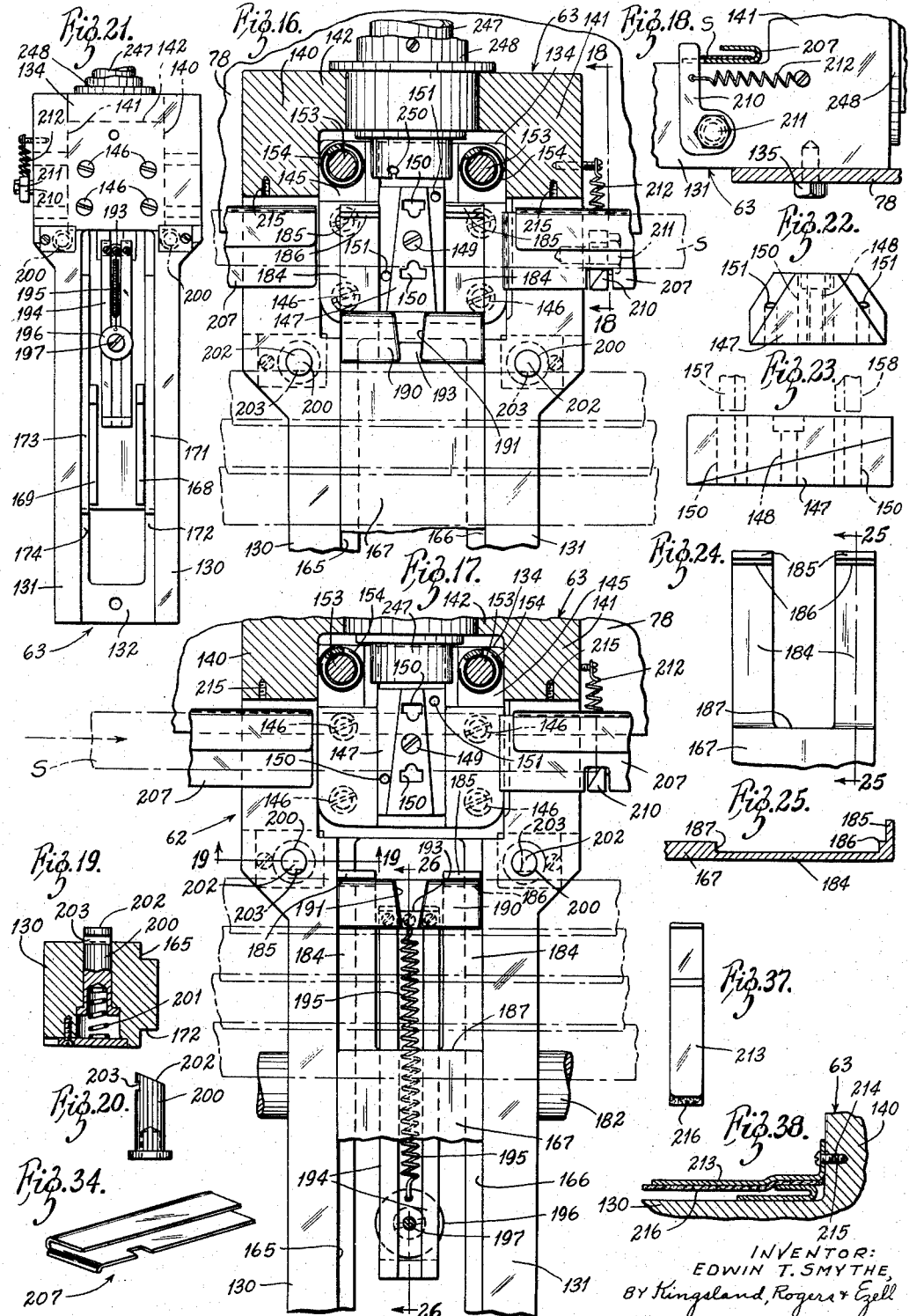

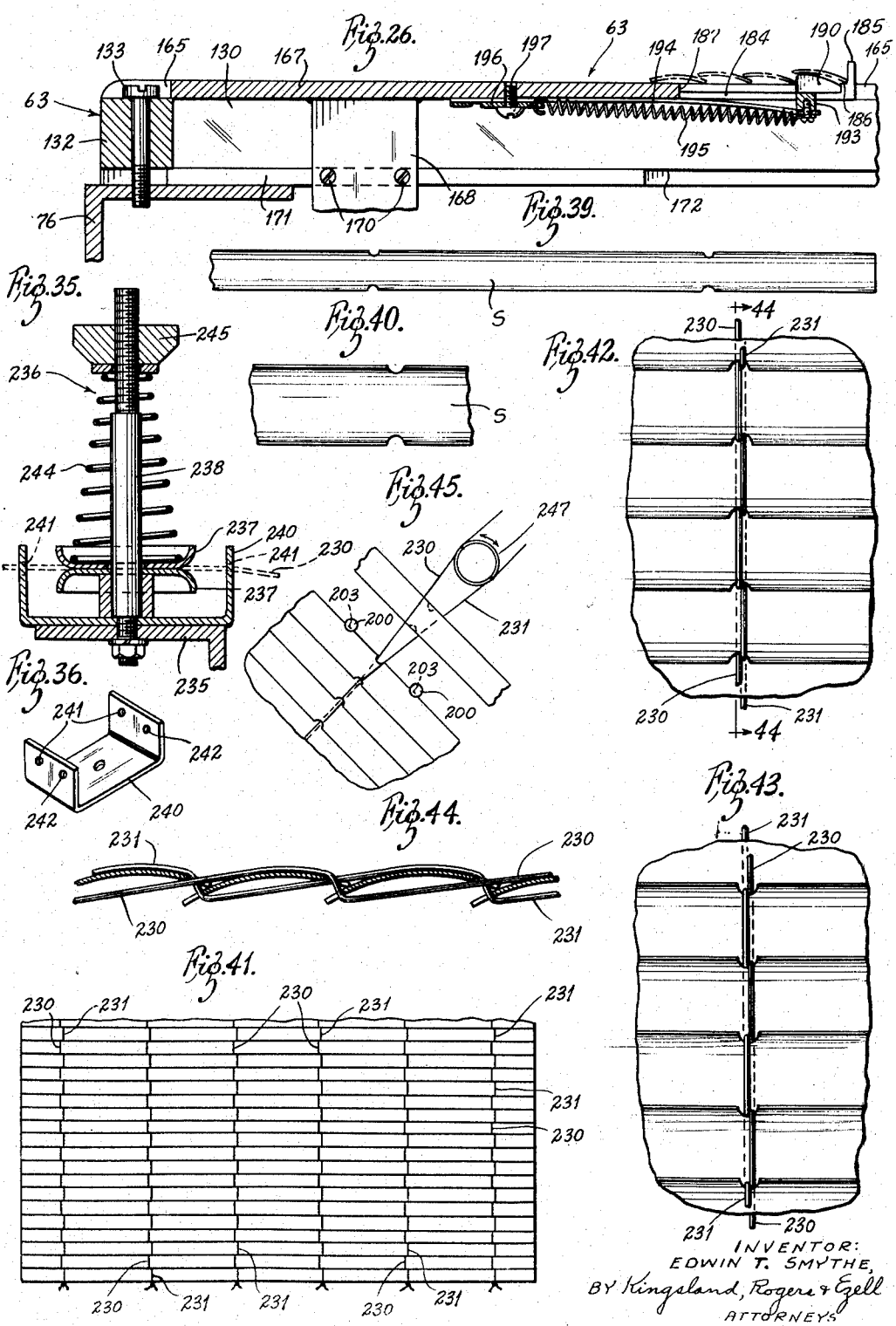

United States Patent Office 2,886,069
Patented May 12, 1959

2,886,069
MACHINE FOR MAKING SLATTED MATERIAL

Edwin T. Smythe, Tacoma, Wash., assignor to Artcraft Venetian Blind Manufacturing Company of St. Louis, St. Louis, Mo., a corporation of Missouri Application August 2, 1956, Serial No. 601,834

20 Claims. (Cl. 139—11)

The present invention is a machine for making slatted material or a fabric of slats. More particularly, the machine can be illustrated in connection with the manufacture of a fabric or material consisting of a plurality of elongated slats formed of plastic or the like material woven together by a plurality of spaced cord arrangements so that the ultimate fabric can be rolled up if desired. The fabric, for example, may be used as a curtain or a blind.

The purpose of the machine is to take strip material, such as polystyrene strips of concavo-convex cross section, from a supply such as a coil, cut the same, notch it at intervals along its length on its opposite edges to receive the cords, and weave it with the cords into the fabric, all without requiring any manual action.

The present machine has a feeding means incorporating a shearing device to take the strip material from the supply and cut it, after an appropriate length has been fed into the machine. The amount fed in is subject to adjustment to suit the conditions or the desired width of the fabric being made. Thereupon, in properly coordinated manner, the machine punches the notches on opposite edges of the strips at various positions along its length, the strip being held in proper position with respect to punches and dies while the action occurs. After it is notched, the strip is displaced into its ultimate position adjacent the next previously formed strip in the fabric, and is, in the process, fitted between two cords that are used to weave the material into the fabric. The cords are drawn tight and the new strip added to the fabric is held snugly in place. Then the machine turns the two cords of each set so that they cross over on the free side of the newly added strip, prior to the introduction of a new strip. The angle or apex of the angle of the cords from the last formed strip forms the receiving means for the next strip.

It is an object of this invention to provide a machine that will do all of the foregoing functions of feeding a strip of any desired length, shearing the same from the supply, punching it to provide the notches, delivering it to the previously formed fabric, and crossing over the cords after it is formed to receive a subsequent strip.

Other objects include the provision of means for operating the machine to accommodate strips of different lengths, so that the width of the ultimate fabric can be adjusted. Also, it is an object to provide a machine that can be changed to accommodate strip material of different widths or to provide notches of different shapes by a simple substitution of punch and die sets or other equivalent means.

Other objects of the invention will appear from the description to follow.

Figure 1 is a plan view of the machine;
Figure 2 is a front elevational view;
Figure 3 is a right end view of the machine;
Figure 4 is a rear elevational view, partly in section and partly broken away at the bottom, taken approximately on the line 4—4 of Figure 3;

Figure 5 is a vertical sectional view taken approximately on the line 5—5 near the right end of Figure 2;
Figure 6 is a sectional plan view of the feed and cut-off mechanism taken on the line 6—6 near the upper left of Figure 2;
Figure 7 is a vertical sectional view of the feed mechanism on an enlarged scale, taken on the line 7—7 at the upper left of Figure 2;
Figure 8 is a transverse section of the cut-off mechanism taken on the line 8—8 of Figure 6;
Figure 9 is a longitudinal section of the cut-off mechanism taken on the line 9—9 of Figure 8;
Figure 10 is an enlarged reproduction, partly in section, of a portion of Figure 2 illustrating a drag brake for the main drive shaft;
Figure 11 is a fragmentary sectional view demonstrating the mounting for a micro switch supporting rod;
Figure 12 is a reproduction on an enlarged scale of a fragmentary portion of Figure 1 illustrating a plan view of one of the operating heads of the machine;
Figure 13 is a front-to-rear section through an operating head taken on the line 13—13 of Figure 12;
Figure 14 is a section through an operating head taken on the line 14—14 of Figure 13, illustrating the mounting of a stacking slide plate;
Figure 15 is a vertical section through the operating head taken on the lines 14—14 and 15—15 of Figure 13;
Figure 16 is an enlarged horizontal section through the operating head taken on the line 16—16 of Figure 15 with the slide in rearward position;
Figure 17 is a view similar to Figure 16 with the slide in forward position;
Figure 18 is a fragmentary view illustrating a springing finger taken on the line 18—18 at the right of Figure 16;
Figure 19 is a vertical section of a stop pin taken on the line 19—19 at the middle-left of Figure 17;
Figure 20 is a detail view of the pin included in Figure 19;
Figure 21 is a bottom view of one of the operating heads removed from the machine;
Figure 22 is an end view of a die block seen from the rear in Figures 16 and 17;
Figure 23 is a side elevational view of the die block seen from the left side in Figures 16 and 17;
Figure 24 is a plan view of the rear end of a slide plate;
Figure 25 is a vertical section on the line 25—25 of Figure 24 ;
Figure 26 is a transverse vertical section of the slide plate taken approximately on the line 26—26 at the lower middle axis of Figure 17;
Figure 27 is a top plan view of the punch block;
Figure 28 is a bottom plan view thereof on an enlarged scale;
Figure 29 is a detail view of a conventional micro switch, its disposition relatively to a strip guide being shown schematically;
Figure 30 is a view of the micro switch as seen from the opposite side;
Figure 31 is a side elevation partly in section of a string guide tube;
Figure 32 is a left end elevation thereof;
Figure 33 is a section on an enlarged scale taken on the line 33—33 of Figure 31;
Figure 34 is a perspective view of one of the strip guides;
Figure 35 is a vertical section through one of the string tensioning devices;
Figure 36 is a perspective view of a string guide incorporated into the assembly of Figure 35;
Figure 37 is a plan view of one of a plurality of holddown elements included in the machine;

Figure 38 is a sectional view through the hold-down element, illustrating how it is mounted;

Figure 39 is a fragmentary plan view of a punched strip;

Figure 40 is an inverted plan view of a portion thereof;

Figure 41 is a small scale view of the product;

Figure 42 is an enlarged reproduction of a fragmentary portion of Figure 41 showing the top side of the slatted material;

Figure 43 illustrates the reverse side of Figure 42;

Figure 44 is an enlarged section through the product along the line 44—44 of Figure 42; and Figure 45 is a schematic demonstration of a part of the weaving operation.

The purpose of this machine is to receive strip material, which may be plastic, metal, or the like, to feed the material to the machine to shear it into slats of appropriate lengths, to continue the feed of the slats in succession, to notch each slat, and then weave it into a material or fabric. Reference to Figure 41 will show that the fabric is made up of a plurality of slats that are woven together at several points along their lengths, the number of such weavings being dependent on the length of the slats. Without going into detail at this point we may further refer to Figures 42, 43 and 44, which show that the slats are oppositely notched on their edges where the weaving is located. Figure 45 shows that the weaving is produced by a combination of two cords. The machine not only notches the slats on their opposite edges at the appropriate points along their lengths, but also weaves the strips with the cords to produce the fabric illustrated in Figures 41–43.

This machine consists of a base or support generally designated 60 at one side of which there is a feeding and cutoff apparatus generally designated 61; and on the top of which there is a punching, packing, and weaving aparatus generally designated as 62. The punching, packing, and weaving mechanism 62 includes a large number of operating heads 63, some or all of which may be connected for operation. In the description to follow, the explanation will largely be limited to one typical operating head.

In detail, the base or frame 60 includes a plurality of uprights or legs 67–74 inclusive, that may be formed of angle stock as illustrated. The legs may be secured to bottom plate 75 which may be of any appropriate shape. At the top of the front legs 67–70 are jointed by an angle 76. The right end legs 70 and 71 are joined by an angle 77, the vertical flange of which may be partly cut away as illustrated in Figure 3. The back legs, 71–74 are joined at the top by an angle 78 and the right end legs 67 and 74 are joined by an angle 79.

The machine is designed to receive a strip S that may be supplied from a roll of material such as a roll of concavo-convex plastic strip stock approximately three quarters of an inch wide. Obviously, other sizes and other materials may be handled by this machine.

*The feed and shear mechanism*

The feeder mechanism 61 at the left end of the machine is designed to cause the strip material to feed from left to right in Figure 2 across the top of the frame 60. This feed mechanism comprises an upper bracket 82 that is attached to the left end of the frame 60 towards the rear thereof. It has an angular shape so that it can be secured to the leg 74, with its horizontal leg at about the elevation of the top of the frame 60.

To the underside of the horizontal leg of the support 82 is attached an extension support 84 that projects to the left as illustrated in Figure 2 and the related figures. At the outer or leftward end of the support plate 84 there are upstanding, spaced, vertical walls 85 and 86, connected at their top by a bracket portion 87 that has an overhanging part 88.

The two walls 85 and 86 support a shaft 89 that drives a feed roller 90 mounted on the shaft between the two vertical walls 85 and 86. An upper pressure roller 91 is mounted on a short shaft 92, that is supported in an inverted U-shaped bracket 93, so as to move vertically in a vertical slot in the upper parts of the two side walls 85 and 86. Strips 95 hold the U-shaped bracket 93 within the two walls 85 and 86. A setscrew 96 limits the upward movement of the bracket 93 and thereby determines the maximum spacing between the two rollers 90 and 91 and hence adjusts the pressure that the pressure roller applies to the strip S.

The lower feed roller 90 is power driven. A motor 98 is mounted upon a suporting frame 99 extending leftward from the two frame legs 67 and 74 in the manner illustrated. The frame 99 also has vertical uprights 100 at its left end that have appropriate bearings to support a pulley shaft 101. The pulley shaft 101 has a first pulley 102 connected by a belt 103 to be driven by the motor 98. A second pulley 104 on the shaft 101, is connected by a belt 105, to drive a pulley 106 mounted on the shaft 89.

A feeder channel 110 guides the strip S to the feed rollers while another similar channel 111 receives the strip from the feed rollers and guides it to the cutoff mechanism.

The cutoff mechanism includes the shear anvil plate 112 that is somewhat T-shaped, supported on the bracket 82. A similarly shaped shear plate 113 is supported on the anvil plate 112 for vertical sliding movement, by four slide pins 114. It is urged upwardly by a pair of coil springs 115. Its right end, which is the stem of the T, has a vertical shear blade 116 mounted on it, so that when the shear plate 113 is driven downwardly the shear plate 116 will shear the strip edge against the right-hand edge of the shear anvil 112.

As indicated, the spring 115 drives the shear plate 113 upwardly. Its downward movement is produced by a cam 119 that is driven by an operating shaft 120 that extends across the top of the machine and is supported in bearings as will appear. Its left end projects out over the shear plate 113 and receives the cam 119 that is keyed to it. This cam, as illustrated in Figures 8 and 9 on Sheet 2, has an indentation 122 at its periphery which otherwise is circular. A cam follower roller 123 is mounted in brackets on the top of the shear plate 113 so that it can be held against the surface of the cam 121 by the springs 115. When the cam roller 123 is in the recess 122 the shear plate 113 is up so that the shear plate 116 is above the strip edge. However, as soon as the cam 121 makes a partial revolution the shear plate 116 is driven down into shearing position with respect to the shear anvil 112 and stays there until the cam 121 completes the revolution.

From the foregoing it can be seen that the feed mechanism receives the strip S from the roll for supply and delivers it rightwardly, in the drawing, to the shear mechanism which stops the rightward travel of the strip during revolution of the cam 119, and shears the strip, all in coordination with other operations interrelated with the movement of the shaft 120.

*The operating heads*

There are a plurality of operating heads on the machine. Since they are identical, the description of one will suffice for all. Each of these heads provides for the opposite notching of the strip at certain points in its length and for the supplying of the cords and weaving of the strip into the fabric.

Figure 12 shows the top view of one of the operating heads 63 and the associated views 13–17 and 21 show other sub-assemblies and assemblies of this head. Components of the head are shown in the related views.

The heads 63 are mounted on the top of the frame 60, spanning from the upper front angle 76 to the upper rear angle 78. Figures 3 and 5 illustrate this. In Figure 12 the operating head 63 is shown as having a casting with two upright side plates 130 and 131 that are L-shaped in side elevation. They are connected at their forward ends by a portion 132 integral with the side rails. A screw 133 passes through this front connecting part 132 and attaches it to the front frame angle 76.

At the back end over the back angle 78 of the frame 60, the two side rails 130 and 131 of the operating head casting are joined by a bottom connection 134 which acts as a base for a die as will later appear. This back connection 134 is attached to the frame by a screw 135 which passes into it, and through the angle 78 of the frame 60.

Each side rail has an upright portion at its rear end. The side rail 130 has an upright portion 140 and the side rail 131 has a similar upright portion 141. These rise above the bottom connection 134 at the rear of the side rails, and are connected by a rear, vertical wall 142 that supports some thread feeding parts as will later appear.

*The strip-notching punches*

The punching of the strip is produced by a fixed die and a movable punch normally elevated above the die.

The die is made removable so that it can be serviced and replaced and also so that the machine can accommodate different sizes and spacings of notches. There is a die base 145 that is attached to the bottom plate 134 by four screws 146. These screws 146 appear in Figure 21 as passing upwardly through the bottom 134 of the head 63. They also appear in dotted lines in Figures 16 and 17.

The die is illustrated particularly in Figures 16, 17, 22 and 23, at 147. It has beveled upper corners with an increasing bevel towards the rear so that its top surface tapers inwardly toward the rear. It is provided with an appropriate screw hole 148 to receive a screw 149 by means of which it may be removably attached to the die plate 145. Its upper surface has two holes 150 to receive the punches when the die is operated. At its lower left and upper right corners in Figures 16 and 17 the die is provided with pin holes 151 by means of which it may be properly located on the die bed and may be held from twisting. This is a familiar aligning arrangement for dies and need not be described in detail.

The punch element 152 is supported by two firm spring-encircled rods 153 or equivalent arrangement, that are adequately supported on or secured in the bottom 134 of the casting member. This mounting provides for the operation of the punch by sliding it down on the two posts or rods 153 which compresses the springs 154 thereon. These springs 154 return the die head 152 upwardly as far as it may go.

The punch head plate 152 supports a punch generally designated 155, which is shown particularly in Figures 13, 27 and 28. The lower side of the plate 152 is channeled and the punch plate 155 is secured in the channel so that it can be held by a screw 156 in proper alignment against displacement. The punch plate has two punch elements, namely, a forward punch element 157 and a rearward punch element 158, that are removably secured to it by screws in the manner illustrated in Figure 28. This provides for replacement of the punches, and the dismounting by the screw 156 provides for the use of different punch plates to accommodate different sizes and shapes of punchings. The illustrated punches have a shape which includes semi-cylindrical parts that put semi-circular notches in the opposite sides of the strips.

The punch plate 152 also supports a roller 160 on its upper surface, the roller being mounted in appropriate angle brackets. This roller 160 is urged by the springs 154 into engagement with a cam 161 that is mounted on the shaft 120. The shaft 120 is the one that is connected into the previously described cutoff cam 119. It therefore is evident that this shaft 120 is supported by the various uprights 140 and 141 of the several operating heads 63, which in turn are mounted on the top of the frame 60. Appropriate collars 162 and 163 are provided on the ends of the shaft 120 beyond the extreme operating head castings, to hold the shaft 120 against endwise movement.

It will be evident that the rotation of the shaft 120 therefore not only rotates the cutoff cam once in each rotation, but also coordinately rotates the cams 161 to depress the punches and punch the strips, once each revolution of the shaft 120. As illustrated, the cam 119 operates the shear and holds it down to limit further infeed of strip for a revolution of the shaft 120. A quarter revolution after the shear action, the cams 161 operate the punches and release them.

It will be understood that the strip is fed rightwardly through the feeding means for predetermined distance that is set by a means that will later be described. After it has fed to the right that distance, it strikes a cutoff or limit switch which causes the operation of the shaft 120 in a way that will later be described to rotate the shear cam 119 and operate the shear and stop the infeed of the strip material, and thereafter to operate the various cams 161 and depress the punches. The severed and punched material then must be fed forwardly toward the front of the machine, and woven into the fabric formed with the previously punched and woven strips, which fabric is being accumulated at the front of the machine. This latter performance is produced by mechanisms associated with the operating heads 63.

*The slat punching mechanism*

Each head 63 has the upper and lower inner edges of its side rails 130 and 131 grooved as shown in Figure 14. The upper grooves 165 and 166 receive and guide a slide plate 167, the top of which lies flush with the top of the slide rails. The slide 167 is driven back and forth within the tracks by an eccentric mechanism illustrated particularly in Figures 13 and 14. The plate 167 has two depending connecting side plates 168 and 169 secured to its underside. The plate 168 is attached as by screws 170 to a slide 171 that can travel and be guided within the lower groove 172 in the side rail 130. In like fashion the side plate 169 is secured to a slide 173 that travels and is guided in the groove 174 in the other side rail 131 of the casting.

At their lower parts the two side plates 168 and 169 are pinned at 177 to a slotted head 178 that is adjustably secured by means 179 to an eccentric follower ring 180. The ring 180 surrounds and is driven by an eccentric cam 181 that is keyed to a shaft 182. The drive to this shaft 182 will be described hereafter. The eccentrics 181 of all the operating heads are connected to this shaft 182.

The eccentric 181 can move the plate 167 from a rearward position illustrated in Figures 13 and 16 to a forward position appearing in Figure 17.

The rear end of the plate 167 is bifurcated so that is has two rearwardly projecting arms 184. At their rear end these arms are turned up to form fingers 185. When the slide 167 moves forwardly and backwardly, the two arms 184 move along the sides of the die block 147.

At their rearward ends, the slide arms 184 are provided with the shoulders 186 at the lower parts of the upturned fingers 185. At the forward ends of the arms 184 there is a shoulder 187 which results from the fact that the thickness of the fingers is less than that of the slide 167.

A crosshead 190 slides on the two arms 184 between the fingers 185 and the shoulder 187 as shown especially in Figure 26. This crosshead has its upper part divided by a groove 191, and its upper surface slopes downward and backward from an elevation above the top of the slide 167 to an elevation as low as the shoulders 186, The crosshead 190 has a depending prong 193 (Figure 26) passing down between the two arms 184. A double-armed leaf spring 194 is attached below the slide 167 and to the prong 193, acting with a downward force to hold the crosshead against the upper surface of the arms 184. A coil spring 195 is secured at one of its ends to the prong 193 between the blades of the leaf spring 194, and at the other end to a washer 196 that is held by a screw 197 to the underside of the slide plate 167. The washer 196 overlies the forward end of the blades of the leaf spring to act as an attachment therefor.

On the opposite sides of the head 63 adjacent the crosshead 190, there are two depressible stop pins 200. When, as in Figure 16, the slide plate 167 is in its rearward position, the forward edge of the crosshead 190, and the shoulder 187 of the slide 167, are back of the forward edges of the pins 200. When the slide plate 167 is forward as in Figure 17, the rear edge of the crosshead 190 and the fingers 185 are just slightly ahead of the forward edges of the pins 200.

As illustrated particularly in Figures 19 and 20 each pin 200 is spring pressed upwardly by coil spring 201 that may be mounted as illustrated in Figure 19. The upper end projecting parts of the pin 200 include the top surface 202 that slopes upwardly toward the front, and the front notch 203.

As previously noted, the strip stock is fed into the machine from the left side in Figures 1 and 2, moving across the several operating heads so as to overlie the several dies 147. There are guides to aid in the positioning of the strip with respect to the die.

To the right or the outlet side of each operating head is a U-shaped guide 207 that has its left hand edge turned down over the side rail 131 of the head 63 adjacent the die block. It may be firmly secured to the head 63 as by welding, and it has a length sufficient to extend rightwardly and overlie the left side of the adjacent head. This can be understood by noting the extension of the guide 207 appearing on the left side of Figures 16 and 17, which actually is the guide that is secured to the next leftward operating head 63.

The cross-sectional shape of the guide 207 appears in Figures 16, 17 and 18, it being apparent that the lower leg of the U-shaped guide extends forwardly further than the upper leg. These guides limit the backward movement of the strip as it is fed through the machine.

The position of the forward edge of the strip S is determined by movable positioning means. In Figures 16, 17 and 18 are shown positioning fingers 210 that are freely pivoted at 211 to the side rail 131 of the operating head 63. A light coil spring 212 yieldably urges the fingers 210 to swivel rearwardly. The upstanding edge of each finger 210 slopes from the front left to the rear right as illustrated particularly in Figures 16 and 17. The end of a strip feeding from left to right across the operating head will be deflected by the angular surface backwardly as far as permitted by the guide 207, and then will slip past the rear edge of the finger 210. The finger yields under influence of the spring 212 in this action. Thus the fingers 210 coact with the U-shaped guides 207 to fix the position of the strip with respect to the dies 147. The spring mounting for the fingers 210 permits the strip material to be displaced forwardly out from the guides, under positive, forwardly-applied forces to be described later.

It may be desirable to have additional guide devices such as those shown in Figures 37 and 38. They consist of guide fingers 213 that are fastened to the uprights 140 and 141 of each operating head 63, by screws 214 that enter holes 215. These holes 215 are illustrated in Figures 16 and 17 without the guides being present in those figures. This is done for purposes of clarity. The guide fingers 213 may have felt linings 216 underneath them so as to prevent injury to the slat material, which first moves in its original strip form from left to right of the machine and then moves forwardly as it is woven into what is here called the fabric.

*Mechanism for weaving the cords onto the slat stock*

The slats are woven with a set of cords, there being two such cords for each head 63. In general, the cords are initially fastened together at the forward edge of the completed fabric, and then diverge in an angle so that a slat may be slipped between them. After a slat is so located, the cords are crossed over to diverge in the opposite direction, so that the next slat can be slipped between them but cannot overlap the previous slat beyond the amount permitted by the notching.

The machine provides two spools of cord for each head. They are supported on a frame 225 at the rear of the machine, as shown especially in Figure 3.

The frame 225 includes a front spool rail 226 and a back spool rail 227 (Fig. 1) that are supported by appropriate bracing back of the machine near its upper part. The rails 226 and 227 support a plurality of upwardly extending pins 228 and 229, respectively.

One supply roll of cord 230 goes over each of the pins 228, and another supply roll of cord 231 goes over each of the pins 229. The cords 230 and 231 are drawn upwardly from the rolls, over round bars 232 and 233, respectively. These bars extend across the machine from side to side, and are supported by T-headed columns 234 at opposite ends of the frame 225.

The framework 225 also has an elevated support rail 235 upon which are mounted a plurality of tensioning devices 236, there being one such for each head and each pair of cords 230 and 231. Since all cording systems are identical, only one will be described in detail.

In Figure 35, the tensioning device 236 is shown as having two opposed, dished washers 237 that are mounted upon a vertical pin 238 supported upon the frame 235 in such wise that the lower washer is spaced above the lower end of the pin. This pin also is mounted within a U-shaped cord guide 240, which is separately illustrated in Figure 36, it having one set of holes 241 for the cord 230 and another set of holes 242 for the cord 231. It therefore directs the two cords between the tensioning washers.

The tension on the washers is maintained by a coil spring 244 surrounding the pin 238, with its compressive force adjustable by a finger nut 245. One of the cords is thus guided by the holes 241 to pass between the washers 237 on one side of the pin 238, and the other cord is guided by the holes 242 to pass between the washers on the other side of the pin 238.

Forwardly of the tensioning device 236, the two cords pass into a guide tube 247 that is supported in the back vertical wall 142 of the casting 134 of the head 63. The guide tube 247 is attached in a flanged bearing 248 that is appropriately journaled in the wall 142, so that it may rock therein.

As shown especially in Figures 31, 32 and 33, the guide tube 247 has a pair of opposite notched openings 250 and 251 at its forward edge. A disc 252 is permanently fitted into the open forward end of the tube 247, thereby to separate the two notched openings 250.

One of the cords 230 and 231 is threaded through each of the holes 250 and 251. These holes, therefore, maintain the two cords in diametrically opposite positions with respect to the guide tube 247. The tube oscillates 180° about its own axis, so that first one of the cords and then the other is at the top. The oscillating mechanism will now be described.

Each guide tube has a sprocket wheel 255 secured to it as by setscrews, as illustrated in Figure 13. Figure 4 shows the array of sprocket wheels 255 across the back of the machine. A sprocket chain 256 passes over and under the various sprocket wheels 255 in the manner shown in Figure 4. It also passes around two idler sprocket wheels 257 at opposite ends of the machine and somewhat below the wheels 255. A rocker arm 258 is attached to the sprocket chain 256 and is rockably mounted at 259 upon a brace 260 extending across between the two support legs 72 and 73. A link 261 is pivotally attached to the arm 258 and also to a crank 262. As will appear from the description of the overall drive mechanism which follows, the operation of the crank 262 is coordinated with the other movements of the operating head mechanisms in proper sequence.

The principal drive source of the machine is an electric motor 275 supported upon a base plate or shelf 276 secured to the legs 68, 69, 72 and 73. The motor drives a belt 277 that in turn drives a pulley forming the outer member of a one-revolution clutch 278. The clutch 278 is, when engaged, adapted to drive a shaft 279 supported in appropriate bearings on the frame of the machine, and, as is illustrated especially in Figures 2, 3 and 4, extending beyond the limits of the two legs 70 and 71 at the right side of the machine. The outer end of the shaft 279 has a friction brake 281. The brake comprises a cylinder 282 attached to the shaft 279 as is shown especially in Figures 3 and 10, this cylinder being received between two arcuate complementary ends of arms 283 and 284 that are mounted upon a screw 285 that passes through their overlapping lower ends. The screw 285 is held by suitable lock nuts onto the cross member 286 of the frame that extends between legs 70 and 71. An outer lock nut 287 is designed particularly to hold the two arms 283 and 284 onto the screw 285.

A machine screw 288 connects the upper ends of the two arms and is adjustable so as to vary the friction imposed by the arms upon the brake cylinder 282. Adjustment of the screw, therefore, enables the user to impose enough drag on the shaft to avoid over-travel when the motor is deenergized or power is otherwise cut off.

The clutch 278 is of the one-revolution type, operated by electromagnetic means. The details are not shown, since these devices are commercially available and well-known. The clutch is connected and disconnected intermittently, so that the motor 275 may run continuously.

The shaft 279 also has a spur gear 292 that drives another spur gear 293 drivingly connected to a short shaft 294. The shaft 294 is supported above the shaft 279 in suitable bearings on the framework. The shaft 294 drives a bevelled gear set 295 to operate the shaft 296 upon which the crank 262 is mounted. By this means, the crank 262 can rotate, and in so doing can oscillate the arm 258 to reciprocate the sprocket chain 256 and thereby to oscillate all of the thread tubes 247. While some tubes 247 oscillate in one direction, and others in the opposite direction, they all move the same amount.

The gear 293 of the shaft 294 also meshes with an upper spur gear 298 that drives the previously mentioned shaft 182, which is supported in suitable bearings so that it can extend across the machine from side to side. The shaft 182 directly drives the various eccentrics 181 so as to move the slides 167 in and out. At its middle portion, the shaft 182 has a sprocket wheel 300 that drives a sprocket chain 301, a sprocket 302 and a counter shaft 303. This counter shaft is mounted in bearings supported on brackets 304 that project backwardly from the legs 72 and 73 of the machine.

The counter shaft has on it another sprocket wheel 305 driving a sprocket chain 306 passing around a sprocket wheel 307 keyed to the shaft 120 that passes through the heads to drive the punch cams 161.

The clutch 278 is adapted to be energized under regulation of an electric solenoid 308 shown especially in Figures 3 and 5, it being supported upon the framework. The solenoid 308, when energized, lifts an actuating clutch plunger 309, which causes the clutch to drive the shaft 279 for one revolution, and then to open, as is typical with clutches of this type.

In order to energize the clutch solenoid 308, a limit switch is provided so that it can be actuated by the infeed of new strip material across the top of the machine.

For the foregoing purposes, a bar 310 is supported by a pair of brackets projecting from the upstanding elements 140 or 141 of two of the heads 63. Figure 11 illustrates one of these brackets 312. Each bracket has a setscrew 313. When the setscrews are loose, the bar or rod 310 may be adjusted crosswise of the machine, and then held again in the adjusted position when the setscrews 313 are again tightened.

Figures 29 and 30 show the limit switch mounting in detail, it also appearing in Figure 2. There is a bracket 315 attached by a setscrew to the rod 310 depending from that rod. The switch housing 316 is mounted upon the bracket. The switch housing pivotally receives a limit switch actuating foot 317 which depends from one side of the switch downwardly and backwardly to within a guide 207 where it can be struck by a new strip S feeding from left to right across the top of the machine. When it is so struck by the strip, the foot 317 is rocked relative to the switch 316 and depresses a switch actuating pin 318. This energizes the clutch solenoid 308, to close the pulley clutch 278 to initiate a single revolution of the shaft 279, and to produce operations of the machine in proper sequence, as will be described.

The switch 316 may be adjusted across the rod 310 so that the length of strip material processed by each cycle of the machine can be preset.

*Operation*

The machine is illustrated as having eight heads, which means that it can supply eight rows of cording across the blind or other slatted fabric that is being woven by the machine. In such case, the fabric will have maximum width of which the particular illustrated machine is capable.

However, the drawings illustrate the limit switch as set over so as to stop the infeed of the strip material to heads short of the right of the machine. Consequently, there will be only six heads actually in use. The other heads become automatically inoperative to feed the cord and their activitiy in operating their punches is of no significance.

Each of the punch and die sets must be set up with the appropriate punches 155. Each punch head 152 is adapted to receive different punch sets 155 and to that end is provided with a screw 156 by means of which any suitable punch may be secured to it. The punches must be selected to suit the width of the strip material in the shape of the notches to be cut. Similarly, the dies are made to correspond with the punches. Each die 147 (Figures 16 and 17) appropriate to the chosen punch is thus placed in position on its die plate 145 and secured by its screw 149, the pins 151 aiding in obtaining proper alignment of this part in the machine.

To begin the operation of the machine, therefore, the two motors 98 and 275 are started. This runs the feed mechanism, and the driving end only of the clutch 278. The limit switch 316 is adjusted on the bar 310 to predetermine the width of the slatted fabric to be made. The strip material is fed from a supply coil or source through the guide 110 and between the feed wheels 90 and 91, so that it may be fed to the right by the driving feed wheel 90.

With the feed motor 98 running, and driving the feed roller 90, the strip S is caused to be fed from left to right. The friction of the feed drive is adjustable by adjusting the screw 96 at the top of the feed mechanism, thereby varying the pressure exerted by the upper feed roll 91 on the top of the strip. From the feed rolls, the strip is guided by the guide 111 to below the cutter block 113 which carries the cutter blade 116. At this time, owing to the position of the shaft 120 at the start of the machine, the cutter block 113 is elevated. Therefore the strip S is fed to the right, entering and passing into the several guides 207 of the heads 63. In this operation, it may engage the sloping left faces of the spring-urged fingers 210, which maintain the strip rearwardly against the back edges of the guides 207. Finally it strikes the foot 317 of the limit switch. Being confined to the guide 207, the strip, which may be of one of the plastic materials such as polystyrene of concavo-convex cross section, cannot buckle, and so moves the foot or feeler 317 to the right, closing the switch 316. This quickly closes the clutch 278 and causes the large motor 275 to be connected to the output shaft 279 of the clutch. As soon as the clutch is once closed, the limit switch may or may not reopen, but the clutch will remain closed until it completes one revolution of the shaft 279.

The shaft 294 is then started in rotation at one-half the speed of the shaft 279, and the shaft 182 is started into rotation at the same speed as the shaft 279. As soon as the shaft 182 starts to rotate, the sprocket chain 301 drives the countershaft 303 which, in turn, through the sprocket chain 306 drives the shaft 120. Thus, in effect, the shaft 120 is started into rotation almost simultaneously with the closing of the limit switch 316.

As soon as the shaft 120 begins to rotate, it promptly removes the notch 122 from the cam roller 123 on the shear, and drives the shear plate 113 downwardly, cutting off the previously infed portion of the strip S. The head 113 remains down until the revolution of the shaft 120 is completed, which will occur simultaneously with the reopening of the clutch 278. Although the feed motor 98 continues to cause strip to be fed to the right at the wheels 90 and 91, the cutter acts as a barrier and the strip material buckles in a large loop which, if the material be concavo-convex polystyrene, will attempt to strighten itself out as soon as it is permitted to do so by the lifting of the block 113 and the cutter 116. This arrangement causes the infeed of all strips after the first one to be quite rapid.

After the first strip is cut off, it is resting in the guides 207 against the back walls thereof, being urged backwardly by the spring actuated guiding arms 210.

At the stage thus reached, there is a strip S across the first six heads 63 of the machine located over their several dies and rearwardly as far as it may go. The upstanding fingers 185 on the arms 184 of the slides 167 are all behind the rear edge of the strip. The punches are all elevated because the cam of the shaft 120 has not made any effective amount of rotation at the time the feed is stopped and the cut-off takes place.

At this time also, the crossheads 190 and the slides 167 are drawn forwardly under the action of the springs 195, as far as they can move. They occupy the position illustrated in Figure 16.

At the time the clutch 278 begins to drive the shaft 279, the shaft 294 will be driven at half the speed of the shaft 279. It will cause the shaft 296 to make corresponding rotation and will commence a half revolution of the arm 262. The arm 262 will rock the link 261 and the rocker arm 258 in Figure 4, which, in turn, will begin a one-half revolution of the several cord guide tubes 247. It may be noted from Figure 16, for example, that the hole 250 through which the thread passes is located at about a ten-thirty o'clock position when the machine is in the condition as illustrated. The movements of the tubes 247 are designed to cause the cords to cross over the dies after the slat has been notched by the punch operation and displaced to parallel juxtaposition with the next previously formed slat. However, in the initial operation of the machine, the cords are not yet drawn across the slot.

As the shaft 279 rotates, the shafts 182 and 120 are caused to rotate, as already noted. Reference to Figure 13 shows that rotation of the shaft 120 begins a counterclockwise rotation of the punch operating cams 161. During the first part of this rotation of these cams, there is no substantial depressing of the punches. Consequently the punches do not interfere with the feeding cycle of the strip. However, by a little over a quarter revolution of the shafts 120, the punches are caused to be driven down to notch the edges of the strip, as is illustrated in Figures 39 and 40. As soon as the cams 161 release the cam followers 160, the springs 153 immediately relift the punch heads from the strip.

As noted, the shaft 182 is, in the meanwhile, turning at the same rate as the shaft 120. In the initial condition, the several eccentrics 181 are in the positions illustrated in Figure 13, which means that the slides 167 are rearward as far as they can go, and the fingers 185 are behind the strip S. During the initial rotation of the eccentrics 181, the followers 180 do not cause any movement of the pins 177 on the slides 167, because of the slots around the pins. Thus, there is no movement of the slides until the punching operation is completed, somewhere around 120 degrees after the rotation begins. As soon as the punching operation is completed, however, the eccentrics will begin to drive the slides 167 forwardly.

In this action, the fingers 185 act against the rear edge of the strip, as illustrated in Figure 26. The strip in the meanwhile rests on the shoulder 186 of each slide, adjacent its two fingers 185.

The slides 167 move forwardly, the fingers 185 pulling the strip forwardly with them. Under the indicated circumstances where there is no previously formed slatted fabric, the crossheads may move forward with the slides 167, under the influence of the springs 195. The strip will be drawn over the top of the pairs of pins 200, to the position illustrated in Figure 17, depressing the pins in the process. It will be noted that the fingers move a little forwardly of the front edges of the pins 200, so that these pins can snap upwardly after the strip has passed over them. Then as the eccentrics 181 complete their course, returning to the positions of Figure 13, they will move the slides again rearwardly, but the strip will be hooked by the grooves 203 in the pins 200 and cannot move rearwardly.

Either at this time or at an appropriate time after the punching is completed, and one strip is thus punched, the machine should be stopped and each pair of cords 230 and 231 drawn forwardly and tied into a knot forwardly of the front edge of the strip. In the illustrated position of the limit switch 316, six pairs of cords are used. As soon as this has been done, the slack in the cords is removed by drawing them backwardly of the tensioning devices 236 until they are taut. The knots will be in the forward notches of the slat, and the slat will be held by the several tied cords rearwardly against the pins 200. When all of the tying is thus completed, the machine is started into operation again. At this time, the first cycle can have been completed and the parts returned to the positions illustrated.

As soon as the cycle forming the first slat is completed, the cutter plate is reelevated, by return of the notch 122 of the cutter cam 119 to the follower 123. This permits the new strip material previously curved into a loop, to move rapidly to the right until it engages the foot of the limit switch. The end of the previous cycle will have caused the clutch 278 to release so that reclosing of the limit switch restarts the clutch for another single revolution. The new strip is thus disposed within the guides 207 and is urged rearwardly by the several fingers 210.

As soon as the feeder motor 98 starts again, the cutter is again actuated and the feed is stopped while the severed second strip is further processed.

At this time, the second strip will have slipped in between the rearwardly diverging cords 230 and 231. Figure 45 illustrates the position the strip occupies in the machine just prior to the punching operation. One of the cords 230 is illustrated as being above the strip while the other cord 231 is below the strip. The tension on the cords holds last slat of the previously formed slatted fabric firmly against the pins 200.

As heretofore noted, the second action produced by the timing shafts after the shearing action is then performed; namely, the punching operation. After the punching operation has been completed, the eccentrics 181 will draw the slides 167 forward of the machine. In this action, the newly formed slat is drawn toward the previous slats and into the apexes between the cords 230 and 231 that diverge rearwardly from the last-formed slat. This action takes place in such wise that the notches on the forward edge of the new slat are aligned with the apexes of the cords.

As the foregoing action starts, the new slat S is resting in its rearward edge on the shoulders 186 of the slide 167, and it is also resting across the dies and the guides. The previously formed slat is held against the pins 200. The forward movement of the fingers 185 pulls the new slat over the top of the dies 147, and then over the upper surfaces of the crosshead 190. These surfaces slope downwardly and rearwardly so that the slat can slip onto them, having its forward edge elevated, so that it may overlap the rearward edge of the previously formed slat. Finally, the fingers 185 engage the crosshead 190 and draw it forwardly with the newly formed slat.

Reference to Figure 26 shows that the previously formed fabric is drawn forwardly by the forward vertical edges of the crosshead 190, after the crosshead moves forwardly of the pins 200. This forward movement of the previously formed fabric, therefore, draws more thread through the tensioning devices.

This forward movement of the slides 167 continues until the parts reach the position shown in Figure 17, in which the newly formed slat has its forward edge elevated above the rearward edge of the previously formed slat. The springs 195 on the slides urge the crossheads forwardly, but do not have enough force to overcome the resistance applied by the tensioning devices 236. Therefore, the crossheads 190, once they have engaged the previously-formed material, lag behind the forward movement of the slide 167, while the springs 195 are extended. However, finally the fingers 185 positively engage the crossheads 190 and displace them, along with the previously-formed material, to the position of Figure 17, in which the newly formed slat has its rearward edge just forward of the pins 200.

Continued rotation of the eccentrics 181 will, after a delay caused by the pin and slot connection 177, start the rearward movement of the slides 167. In this action, the fingers 185 move rearwardly away from the just-formed slat. The springs 195, however, hold the crossheads 190 forwardly and thereby hold the previously formed fabric forwardly, until the rearward edges of the slides 167 strike the forward edges of the crossheads 190 and displace the crossheads back to the position of Figure 16, where their rearward edges rest against the forward edges of the die plates 147. As the fingers 185 thus release the slatted fabric, the tension on the cords by the resiliency of the cords draws the fabric up until the most recently formed slat engages the pins 200. The overlap of the new slat is determined by the cross-over of the cords at the juncture of the slats, it being apparent that the forward edge notches of the new slat register with the rearward edge notches of the previous slat, to accommodate the cords.

At this time, the cord guide tubes 247 are caused to oscillate, to exchange the positions of the upper and lower cords. This causes the cords 230 and 231 to be parallel on opposite sides of the last slat, and to diverge rearwardly from its rearward notches. The geometry of the mechanism operating the tubes 247 is such that the twisting of the cords occurs at the point described, and that the cords are not permitted to become entangled in the punching operation.

Finally, the parts will return to their initial positions, and the one-revolution clutch will drop out, leaving only the feeding motor in driving condition to supply another strip to be fabricated and formed into the slatted material or fabric. The subsequent cycle of this strip will be identical with the foregoing, save only that the crank 262 in the subsequent cycle will operate in the other 180° of its rotation, and the tubes 247 will be operated in the direction opposite that of the previous cycle. Otherwise, however, the action is in all respects the same.

The width of the fabric being formed is predetermined by the position of the limit switch finger that closes the one-revolution clutch. The length of the fabric is determined by how many slats are employed. The width of the slats can be varied with appropriate changing of the dies and punches; but the rest of the machine is capable of accommodating any reasonable variation in the width of the slats.

It was earlier noted that the friction brake 281 applies a drag to the shaft 279. It is, of course, important to have no overtravel in the shaft 279 after the clutch has become disengaged. This brake 281 is adjusted to prevent such overtravel and yet to provide the minimum degree of load consonant with elimination of overtravel.

There are other points of adjustment in the machine. For example, the connection of the eccentric follower 180 and the pin 177 on the slide 167, illustrated in Figure 13, can be adjusted in the manner illustrated there. This is primarily useful to insure that the rearward position of the slide 167 is accurate.

It can be seen that a machine has been provided to fabricate a slatted material, that can perform all the operations automatically, and that is flexible in many respects so as to accommodate all ordinary variations in the material.

What is claimed is:

1. In a machine for making slatted fabric: a cording mechanism; means for feeding slat material from a supply to the cording mechanism; means operated by the infed slat material successively to cut off slats of predetermined length; means for displacing the severed slat laterally to parallel overlapping relationship with previously formed slats, and the cording mechanism including means for cording the severed slat to the previously formed slats with its edge overlapping the edge of the last-formed slat.

2. The machine of claim 1, wherein there is notching means with the cording mechanism, with means operating the notching means to notch the edge of the slat before it is displaced into position with the previously formed slats.

3. The machine of claim 1, wherein the displacing means comprises means to move the slat laterally, means to fix the elevation of the leading edge in such movement, relatively to the previously formed slat, so that it overlaps the same, and means to hold the corded slats together while a subsequent slat is being formed.

4. The machine of claim 3, wherein the cording mechanism includes cord-supply, resistingly yieldable tension-applying means permitting the cord to be withdrawn from the supply as a new slat is added to the material by operation of the displacing means, the cords thereby applying force drawing the cord taut.

5. In a machine for making slatted fabric: a supporting frame; means on the frame to receive a strip of material, a slide on the frame movable laterally of the strip, having means to engage the strip and move it laterally, means on the slide to locate the elevation of the leading edge of the strip so it may be moved into overlapping relationship to previously fabricated strips; cording means to cord the strip into connection with the previously fabricated strips; the cording means including means yieldably applying force to the cord tending to draw the fabricated slats in the direction opposite that in which the slide displaces the slat; abutment means on the frame, the slide being movable to displace the slat beyond the abutment means, and the abutment means then holding the slat against return movement with the slide, under influence of the force on the cord.

6. In a machine for making slatted fabric by adding a slat to previously formed slats corded together: a supporting frame; a slide device on the frame to receive a new strip and to displace it laterally into parallel association with the other strips, cording means to fasten the strip to the other strips, and to apply tension on the cords acting against the displacement of the slide device; abutment means on the frame, beyond which the slide can move the strip; and against which the strip may return and be held by the tension of the ends; and means cooperable with the slide to engage previously corded strips connected with the cords and displace them in advance of the newly formed slat as the slide moves the latter.

7. The machine of claim 6, wherein the cooperable means comprises an element on the slide that engages the strip and positions its forward edge for overlapping engagement with the previously-formed slats.

8. In a machine for making slatted fabric by adding a slat to previously formed slats corded together: a supporting frame, a reciprocable device connected with the frame to receive a new strip, the device being movable laterally of the strip forth and back, to displace the strip laterally into parallel association with the other strips; cording means to fasten the strip to other strips including a pair of cords attached to the other strips, diverging from the last of them in an angle, and being disposed on opposite sides of the new slat, the cording means applying tension to the cords in a direction opposite to that in which the new strip is moved by the reciprocable device; abutment means on the frame, beyond which the slide can move the strip and against which the strip can return and be held by the tension of the cords; and means coordinated with the reciprocable device to engage the previously corded strips and displace them away from the abutment means to permit a new strip to be introduced behind the abutment means.

9. The machine of claim 8, wherein the coordinated means includes an element that also engages the new strip and positions its forward edge to overlap the adjacent edge of the previously formed strip.

10. The machine of claim 9, wherein the element recited therein is movable relatively to the reciprocable device, and is engageable by the same to be displaced thereby to move the material as aforesaid, and means yieldably urging the element into such engagement.

11. The machine of claim 8 with strip notching means, and means operating the same to notch the strip prior to its being displaced into the previously-formed material.

12. The combination of claim 11, wherein there are means to position the strip and hold the same against lateral displacement during the operation of the notching means.

13. The combination of claim 11 wherein there is a single power-operated member drivingly connected to both the reciprocable device and the notching means, to operate the same in predetermined time relationship.

14. The combination of claim 13, wherein there is operating means to cause power-operation of the power-operated member, and means actuated by the advance of the strip into position on the frame, to operate the operating means.

15. The combination of claim 14 wherein there is material feeding means, and cutting means, to feed strip material onto the frame and to cut off a strip therefrom, and means connecting the cutting means to the operating means so that it can be operated thereby in timed relationship to the notching and displacing means in response to infeed of strip material by the feeding means.

16. The combination of claim 14, wherein the means actuated by the strip is adjustable in the direction of infeed of the strip, so that the length of the strips may be preselected.

17. A machine for making slatted material by adding slats into material formed of slats previously corded together, comprising: a frame having a plurality of heads thereon for reciprocation forth and back across the frame; means for feeding strip material across the heads; the heads having punch and die means and means to position the infed material with respect to the punch and die means; displaceable means associated with each head, engageable with the strip in such position, and movable to displace it transversely of the heads into parallel juxtaposition with the last-formed slat in the previously formed material; there being two cords for each head, extending from the previously corded material, cord-delivering means on the head positioning one cord above the new strip and the other below it, so that the strip is displaced into the apexes formed between the two cords of each head; means for reversing the cord-delivering means, to reverse the positions of the upper and lower ends; power means, and means connecting the power means to the punch and die means, the displaceable means, and the cord-delivering means, including mechanism to cause them to operate in the sequence last named.

18. The machine of claim 17, wherein there is strip shearing means to sever slats from a supply of strip material; limit switch means adjustably disposed in the path of the infed strip, and operated by the strips being fed in to the location of the limit switch, and mechanism operated by the limit switch to start the power means and cause it to operate the strip shearing means, and then the other means in the order previously indicated.

19. In a machine for making slatted fabric: a supporting frame; means on the frame to receive a strip of material, cording means adjacent the strip receiving means for weaving the strip together with other previously corded strips into the fabric; means for producing relative displacement between the adjacent edge of one strip to be woven into the fabric and that of the last previously woven strip, so that the said adjacent edges overlap.

20. The machine of claim 19 wherein the strips are notched adjacent the cords, and there are two cords, one on each side of the strip, each cord passing through the notches, under one strip and over the next strip.

References Cited in the file of this patent

UNITED STATES PATENTS

| | | |
|---|---|---|
| 605,928 | Shuster | June 21, 1898 |
| 1,515,595 | Friend | Nov. 18, 1924 |
| 2,480,395 | Clark | Aug. 30, 1949 |